United States Patent [19]

Sawaki

[11] Patent Number: 4,638,222
[45] Date of Patent: Jan. 20, 1987

[54] DC MOTOR DRIVING CIRCUIT FOR ELIMINATING SPURIOUS TRANSITION CONDITIONS

[75] Inventor: Manabu Sawaki, Saitama, Japan

[73] Assignee: Pioneer Electronic Corporation, Tokyo, Japan

[21] Appl. No.: 764,044

[22] Filed: Aug. 9, 1985

[30] Foreign Application Priority Data

Aug. 13, 1984 [JP] Japan ................... 59-168995

[51] Int. Cl.⁴ ............................................. H02P 7/68
[52] U.S. Cl. ..................................... 318/111; 318/53; 318/112
[58] Field of Search ............... 318/105, 111, 112, 113, 318/138, 254 A, 254, 439, 53

[56] References Cited

U.S. PATENT DOCUMENTS

| 4,249,116 | 2/1981 | Hieda | 318/254 |
| 4,250,544 | 2/1981 | Alley | 318/254 X |
| 4,415,845 | 11/1983 | Oudet | 318/254 X |
| 4,525,657 | 6/1985 | Nakase et al. | 318/254 |

FOREIGN PATENT DOCUMENTS

| 56-10091 | 2/1981 | Japan | 318/138 |
| 57-28587 | 2/1982 | Japan | 318/138 |
| 58-63098 | 4/1983 | Japan | 318/254 |
| 58-163296 | 9/1983 | Japan | 318/111 |

Primary Examiner—William M. Shoop, Jr.
Assistant Examiner—Bentsu Ro
Attorney, Agent, or Firm—Sughrue, Mion, Zinn, Macpeak, and Seas

[57] ABSTRACT

In a DC motor driving device, upon detection of a change in the content of an input digital signal, supply of signals to switch elements from the output terminals of the decoder is suspended for a predetermined period of time following the detection of the change, and, during this predetermined period of time, the decoder's logical conversion operation is accomplished. With this arrangement, the difficulty of two series-connected switch elements being simultaneously applied with a voltage and turned on simultaneously is eliminated.

4 Claims, 4 Drawing Figures

DC MOTOR DRIVING CIRCUIT FOR ELIMINATING SPURIOUS TRANSITION CONDITIONS

BACKGROUND OF THE INVENTION

The present invention relates to a DC motor driving device.

An example of a DC motor driving device which receives a digital signal and effects the selective rotation of ones of DC motors in a direction specified by the content of the digital signal is shown in FIG. 1.

In FIG. 1, input terminals $IN_0$ through $IN_3$ are connected to a decoder 1. In the decoder 1, a four-bit digital signal is subjected to logic conversion to obtain a 12-bit logic output. The first through twelfth output terminals of the decoder 1 are connected to a switch circuit 2. The switch circuit 2 has twelve transistors 201 through 212 corresponding to the first through twelfth output terminals of the decoder 1. The bases of the transistors 201 through 212 are connected to the first through twelfth output terminals, respectively, of the decoder 1. The emitter of the transistor 201 is connected to the collector of the transistor 204, and their connecting point is connected to an output terminal $O_2$ of the switch circuit 2. The emitter of the transistor 202 is connected to the collector of the transistor 205, and their connecting point is connected to an output terminal $O_1$ of the switch circuit 2. The emitter of the transistor 203 is connected to the collector of the transistor 206, and their connecting point is connected to an output terminal $O_0$ of the switch circuit 2. The collectors of the transistors 201 through 203 receive a supply voltage $V_{cc}$. The emitters of the transistors 204 through 206 are grounded. The switch circuit 2 has output terminals $O_3$ through $O_5$. The transistors 207 through 212 are connected in the same circuit configuration as the above-described transistors 201 through 206, and are connected to the output terminals $O_3$, $O_4$ and $O_5$ as shown in FIG. 1.

A DC motor 3 is connected between the output terminals $O_0$ and $O_1$, a DC motor 4 between the output terminals $O_1$ and $O_2$, a DC motor 5 between the output terminals $O_3$ and $O_4$, and a DC motor 6 between the output terminals $O_4$ and $O_5$. Each of the DC motors 3 through 6 has positive and negative terminals. The negative terminals of the motor 3 and 4 are connected to the output terminal $O_1$, while the negative terminals of the motors 5 and 6 are connected to the output terminal $O_4$. When the voltage $V_{cc}$ is applied to the motors 3 through 6 in the normal polarity, the motors rotate in a predetermined direction, here assumed to be the forward direction. When the voltage $V_{cc}$ is applied to the motors with the opposite polarity, the motors turn in the reverse direction.

In the conventional DC motor driving device thus constructed, a four-bit digital signal is applied through the input terminals $IN_0$ through $IN_3$ to the input terminals A, B, C and D of the decoder 1. In the decoder 1, the four-bit digital signal is converted into a 12-bit digital signal using a predetermined coding system, and the converted output is provided at the first through twelfth output terminals. Specifically, when the input digital signal is a logic "0000", then all the output terminals are at logic "0", and when the input digital signal is a value between logic "0001" and "1111", then one of the first through twelfth output terminals is at logic "1". The decoder 1 provides positive logic outputs; that is, logic "0" corresponds to a low level and logic "1" to a high level. Thus, only transistors in the switch circuit 2 connected to output terminals of the decoder 1 at the high level are rendered conductive (turned on). If, for instance, the third and fifth output terminals of the decoder 1 are high levels, then the transistors 203 and 205 are rendered conductive. Therefore, the voltage $V_{cc}$ is applied through the transistors 203 and 205 to the motor 3 in the normal polarity to cause the latter to rotate in the forward direction.

When the content of the input digital signal changes, the levels of specific ones of the output terminals also change. If, for example, the second and sixth output terminals of the decoder 1 are raised to the high level, then the transistors 202 and 206 are rendered conductive, as a result of which the voltage $V_{cc}$ is applied to the motor 3 in the opposite polarity to cause the latter to rotate in the reverse direction.

It should be noted that the content of the input digital signal is such that two series-connected transistors (transistors 201 and 204, for instance) cannot rendered conductive at the same time.

In the conventional DC motor driving device, the response time which elapses from the time instant that a digital signal is supplied to the decoder 1 until new conversion results are provided at the output terminals depends upon the content of the applied input digital signals. That is, the decoder 1 is implemented with a number of gate circuits, such as NAND gates and OR gates, and input digital signals pass through different numbers of gates depending on the states of the various bits thereof, as a result of which different response times can occur for different output terminal for some changes in the state of the input signal bits. Thus, although the decoder is designed so that two series-connected transistors should not be rendered conductive at the same time, due to the different response times at different the output terminals, sometimes two series-connected transistors are momentarily turned on simultaneously. In such an event, large currents flow in the two transistors, as a result of which the transistors can be damaged or their servce life reduced.

SUMMARY OF THE INVENTION

Accordingly, an object of the present invention is to provide a DC motor driving device in which, even when response times are different at different output terminals of the decoder, simultaneous driving of two-series-connected transistors even momentarily is eliminated.

The foregoing object and other objects of the invention have been achieved by the provision of a DC motor driving device which, according to the invention, comprises: latch means for producing a detection signal when the contents of input and output signals of the latch means are not the same; first and second switch elements series connected to each other through a series-connecting point connected also to one terminal of a DC motor; third and fourth switch elements series-connected to each other through a series-connecting point connected also to the other terminal of the DC motor; voltage supplying means for supplying a voltage to a series circuit of the first and second switch elements and to a series circuit of the third and fourth switch elements; a decoder, having output terminals corresponding to the first through fourth switch elements, for subjecting an output signal of the latch means to logical conversion, the first through fourth switch elements being turned on in accordance with the results of the logical conversion; and delay means relaying an output signal of the decoder to the first through fourth switch elements and suspending the application of the output signal of the decoder to the first through fourth switch elements for a predetermined period of time upon the occurrence of the detection signal.

The nature, principle and utility of the invention will become more apparent from the following detailed description when read in conjunction with the accompanying drawings.

DESCRIPTION OF THE PREFERRED EMBODIMENTS

Figure 1:
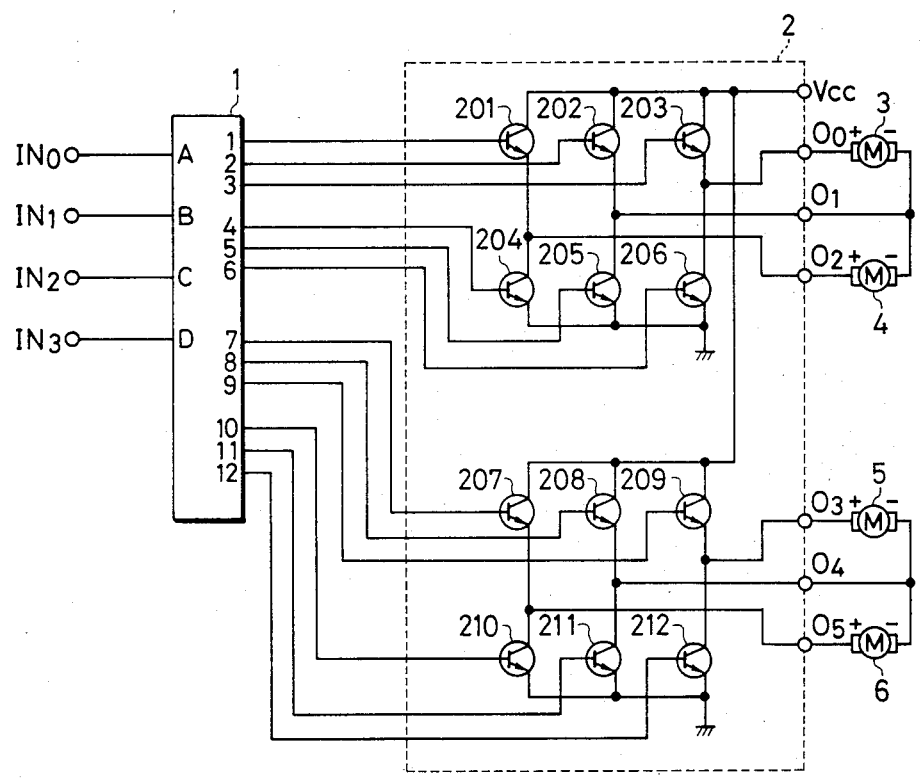
FIG. 1 is a circuit diagram showing an example of a conventional DC motor driving device.
Figure 2:
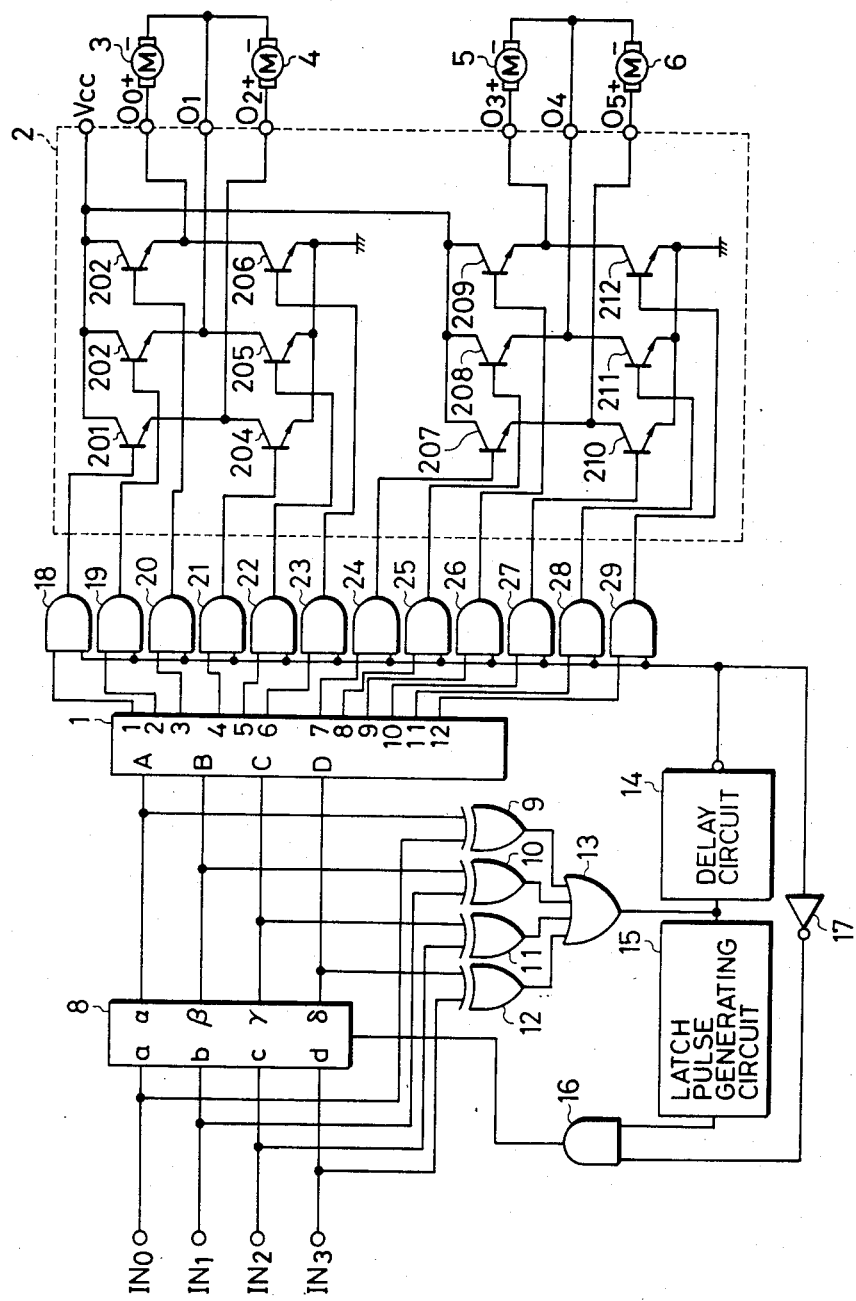
FIG. 2 is a circuit diagram showing an example of a DC motor driving device according to the invention.

An example of a DC motor driving device according to the invention will be described with reference to FIG. 2. In FIG. 2, those components which have been previously described with reference to FIG. 1 are therefore designated by the same reference numerals or characters.

A latch circuit 8 is provided between the input terminals $IN_0$ through $IN_3$ and the input terminals A, B, C and D of the decoder 1. EXCLUSIVE-OR gates 9 through 12 have inputs connected to the input/output terminals (a and $\alpha$), (b and $\beta$), (c and $\gamma$), and (d and $\delta$), respectively. An OR gate 13, having inputs connected to the output terminals of the EXCLUSIVE-OR gates 9 through 12, forms the logical sum of the outputs of the EXCLUSIVE-OR gates 9 through 12. The output terminal of the OR gate 13 is connected to a delay circuit 14 and a latch pulse generating circuit 14. The delay circuit 14 is designed so that, upon reception of a high level signal, the delay circuit 14 first continues to output a low level signal and then provides a high level signal a predetermined period of time thereafter, while a change from a high level to a low level propagates directly through the delay circuit 14. The latch pulse generating circuit 15 is implemented with a monostable multivibrator, for instance. Upon reception of a high level signal, the latch pulse generating circuit 15 produces a latch pulse having a predetermined width. The output terminal of the latch pulse generating circuit is connected to one input terminal of an AND gate 16, the other input terminal of which is connected through an inverter 17 to the delay circuit 14. The output terminal of the AND gate 16 is connected to the control terminal of the latch circuit 8.

AND gates 18 through 29 are provided in correspondence with the first through twelfth output terminals of the decoder 1. The output terminal of the first through twelfth output terminals are connected to first input terminals of the respective AND gates 18 through 29. The remaining input terminals of the AND gates 18 through 29 are connected to the output terminal of the delay circuit 14. The output terminals of the AND gates 18 through 29 are connected to the bases of transistors 201 through 212, respectively.

In the DC motor driving device thus constructed, a four-bit parallel digital signal is applied through the input terminals $IN_0$ through $IN_3$ to the input terminals a, b, c and d of the latch circuit 8. The exclusive ORs of the input/output terminal pairs (a and $\alpha$), (b and $\beta$), (c and $\gamma$), and (d and $\delta$) of the latch circuit 8 are formed by the EXCLUSIVE-OR gates 9 through 12, respectively. When the input and output pairs of the latch circuit 8 are equal to each other, the outputs of the EXCLUSIVE-OR gates 9 through 12 are all at the low level. When the content of the input digital signal changes and at least one of the input and output signal pairs of the latch circuit 8 are different from each other, at least one of the outputs of the EXCLUSIVE-OR gates 9 through 12 is raised to the high level, and therefore the output of the OR gate 13 is rased to the high level. When the output of the OR gate 13 is raised to the high level, as described above, the output of the delay circuit 14 is set to the low level immediately, and the outputs of the AND gates 18 through 29 are set to the low level irrespective of the output levels of the decoder 1, and therefore all of the transistors 201 through 212 are rendered nonconductive (off). When the output of the OR gate 13 is at the high level, the latch pulse generating circuit 15 produces a high level latch pulse. Since the output of the delay circuit 14 is then at the low level, the output of the inverter 17 is at the high level, and therefore the latch pulse is supplied through the AND gate 16 to the latch circuit 8. Hence, the latch circuit 8 reads and holds new digital signal levels supplied to the input terminals a, b, c and d then provides those levels at the output terminals $\alpha$, $\beta$, $\gamma$ and $\delta$. When the output and input pairs of the latch circuit 8 again become equal in this manner, all the outputs of the EXCLUSIVE-OR gates 9 through 12 are set to the low level, and hence the output of the OR gates 9 through 12 are set to the low level, as well as the output of the OR gate 13.

The latch pulse disappears a predetermined time $t_a$ after its generation, irrespective of the change of the output level of the OR gate 13. When the latch pulse disappears, the latch circuit 8 inhibits reading the input levels and continues to output the read and held levels to the output terminals $\alpha$, $\beta$, $\gamma$ and $\delta$. In response to the new output signal of the latch circuit 8 supplied to the decoder 1, a new logical conversion result is provided at the first through twelfth output terminals of the decoder 1. In this operation, the output of the delay circuit 14 is at the low level, and therefore the outputs of the AND gates 18 through 29 are held at the low level. The output of the delay circuit 14 is raised to the high level a predetermined period of time $t_b$ ($t_b > t_a$) after it was set to the low level, as a result of which the levels of the first through twelfth output terminals of the decoder 1 are supplied through the AND gates 18 through 29 to the transistors 201 and 212, respectively. The transistor to which the high level has been supplied is rendered conductive, and thus supplies the source voltage to one of the DC motors 3 through 6.

Figure 3:
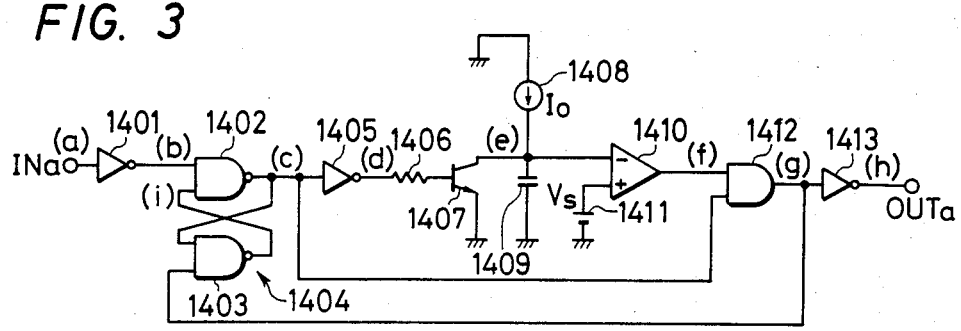
FIG. 3 is a circuit diagram showing an example of a delay circuit in the device of the invention.

FIG. 3 shows an example of the construction of the delay circuit 14. The output of an RS flip-flop 1404, composed of two NAND gates 1402 and 1403, is connected through an inverter 1401 to an input terminal $IN_a$ to which the output signal of the OR gate 13 is applied. One input terminal of the NAND gate 1402 acts as the set terminal of the flip-flop 1404, while one input terminal of the NAND circuit 1403 acts as the reset terminal of the flip-flop 1404. The output terminal of the NAND circuit 1402 is the output terminal of the flip-flop 1404. This output terminal is connected through an inverter 1405 and a resistor 1406 to the base of a transistor 1047, the emitter of which is grounded. A constant current source 1408 and a capacitor 1409 are parallel connected between the collector and the emitter of the transistor 1407. The collector line of the transistor 1407 is connected to one input terminal of a comparator 1410, which compares the charging voltage of the capacitor 1409 with the voltage $V_s$ of an electric source 1411. The output terminal of the comparator 1410 is connected to one input terminal of an AND gate 1412, the other input terminal of which is connected to the output terminal of the flip-flop 1404. The output terminal of the AND gate 1412 is connected to the reset terminal of the flip-flop 1404 and to an inverter 1413. The output terminal of the inverter 1413 is connected to the output terminal $OUT_a$ of the delay circuit 14.

Figure 4:
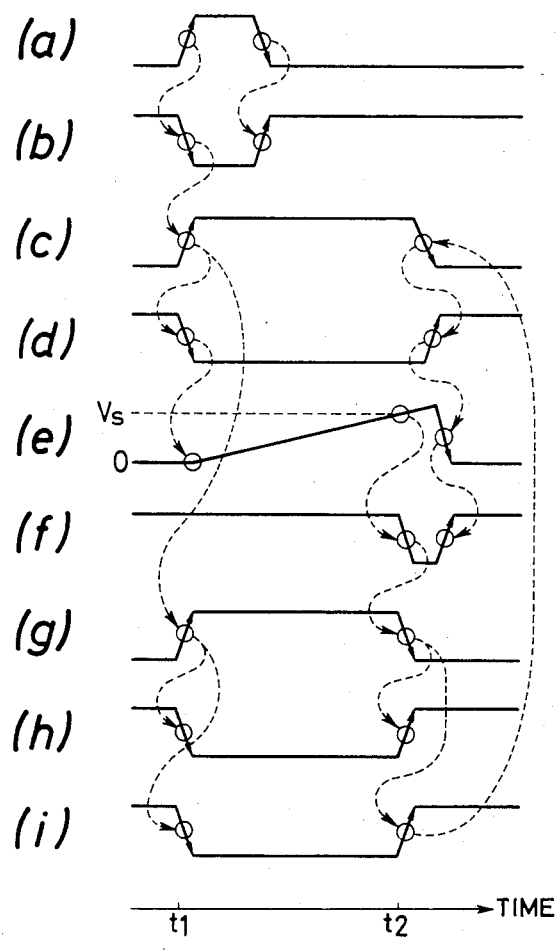
FIG. 4 is a waveform diagram provided for a description of the operation of the delay circuit in FIG. 3.

The operation of the delay circuit 14 thus constructed will be described with reference to FIG. 4.

When the output signal (a) of the OR gate 13 is raised to the high level at the time instant $t_1$, the output (b) of the inverter 1401 is set to the low level. With this low level applied to the set terminal of the flip-flop 1404, the output (c) of the latter is raised to the high level, and therefore the output (d) of the inverter 1405 is set to the low level. As the low level is applied through the resistor 1406 to the base of the transistor 1407, the latter is rendered non-conductive. As a result, a constant current from the constant current source 1408 flows in the capacitor 1409, and hence the latter is charged. The voltage (e) of the capacitor 1409 then increases. At the start of the charging capacitor 1409, the voltage (e) is lower the predetermined voltage $V_s$, and therefore the output (f) of the comparator 1410 is at the high level. Therefore, when the output of the flip-flop 1404 is raised to the high level, the output (g) of the AND gate 1412 is raised to the high level, while the output (h) of the inverter 1413, (i.e., the output of the delay circuit 14) is set to the low level.

The high level signal outputted by the AND gate 1412 is applied to one input terminal of the AND gate 1403, the other input terminal of which is held at the same level as that of the output of the AND gate 1402 (the high level). Therefore, the output (i) of the NAND gate 1403 is set to the low level, and thus the other input terminal of the NAND gate 1402 is held at the low level. Accordingly, even if the output level of the OR gate 13 then changes, the output of the NAND gate 1402 is maintained at the high level and the transistor 1407 is maintained nonconductive (off). As the transistor 1407 is non-conductive, when the terminal voltage of the capacitor 1409 reaches the predetermined voltage $V_s$ at the time instant $t_2$ (which occurs after the time period $t_b$ after the time instant $t_1$), the output (f) of the comparator 1410 is set to the low level. Therefore, the output (g) of the AND gate 1412 is set to the low level, and thus the output (h) of the inverter 1413 is raised to the high level. As this high level is applied to the AND gates 18 through 29 (FIG. 2), the level signal outputted through the first through twelfth output terminals of the decoder 1 is supplied to the switch circuit 2.

The low level output signal of the AND gate 1412 is further applied as a reset signal to the NAND gate 1403 of the flip-flop 1404, whereupon the output of the NAND gate 1403 (i.e., the other input of the NAND circuit 1402) is raised to the high level. In this operation, the latch circuit 8 latches a digital signal having new contents, at which time the four pairs of input output levels of the latch circuit 8 become equal, whereupon the output of the OR gate 13 becomes a low level, as a result of which a high level signal is supplied to the (b) input terminal of the NAND gate 1402 by the inverter 1401. Therefore, the output of the NAND gate 1402 is set to the low level, and a high level signal is applied through the resistor 1406 to the base of the transistor 1407 by the inverter 1405, as a result of which the transistor 1407 is rendered conductive. As a transistor 1407 is conductive, the capacitor 1411 is discharged. The discharging current flow to ground through the transistor 1407. The terminal voltage (e) of the capacitor 1409 drops quickly to a level below the predetermined voltages $V_s$, and therefore the output (f) of the comparator 1410 is raised to a high level from a low level. The high level is applied to the (f) input terminal of the AND gate 1412. However, as the low level output signal from the NAND gate 1402 is applied to the other input terminal of the AND gate 1412, the output of the latter is maintained at the low level. Thus, the delay circuit is placed in its initial state again.

As is apparent from the above description, in the DC motor driving device of the invention, upon detecting that the contents of the input digital signal has changed, the supply of signals to the switching elements from the output terminals of the decoder is suspended for a predetermined period of time chosen such that it is assured that the logical conversion operation of the decoder is completed and that a new conversion output state is present. Therfore, even if the response times required for providing new conversion results are different for different combinations of input bits and hence for different output terminals of the decoder, the difficulty of two series-connected switching elements being simultaneously applied with voltage and turned on at the same time is eliminated. Therefore, the switching elements are prevented from damage.

I claim:

1. A DC motor driving device comprising:
   latch means for holding an input digital signal and outputting an output digital signal in response to a detection signal;
   detecting means for producing said detection signal when corresponding bits of said input signal and said output signal of said latch means are not the same;
   first and second switch elements series-connected to each other through a series-connecting point also connected to a first terminal of a DC motor;
   third and fourth switch elements series-connected to each other through a series-connecting point also connected to a second terminal of said DC motor;
   means for supplying a voltage to a series circuit of said first and second switch elements and to a series circuit of said third and fourth switch elements;
   decoder means, having output terminals connected to control inputs of respective ones of said first through fourth switch elements, for subjecting an output a signal of said latch means to logical conversion and selectively turning on ones of said first through fourth switch elements according to signal produced on said output terminals of said decoder means as a result of said logical conversion; and
   delaying and switching means responsive to said detecting means for delaying an output signal of said decoder to said first through fourth switch elements after a predetermined period of time and for turning off said first through fourth switch elements for said predetermined period of time following production of said detection signal.

2. The DC motor driving device of claim 1, wherein said detecting means comprises: a plurality of EXCLUSIVE-OR gates, one of said EXCLUSIVE-OR gates being provided for each bit of said input digital signal and having first and second inputs coupled to receive respective ones of a corresponding pair of said input and output signals of said latch means; and an OR gate having inputs coupled to outputs of each of said EXCLUSIVE-OR gates, an output of said OR gate being coupled to an input of said delay means.

3. The DC motor driving device of claim 2, further comprising: a latch pulse generating circuit having an input coupled to said output of said OR gate; an inverter having an input coupled to an output of said delaying and switching means; and an AND gate having inputs coupled to an output of said latch pulse generating circuit and an output of said inverter, an output of said AND gate being applied as a clock input to said latch means.

4. The DC motor driving device of claim 2, wherein said delaying and switching means comprises a delay circuit receiving an output of said detecting means and further comprises a plurality of AND gates, each of said AND gates having a first input coupled to a respective output of said decoder means and a second input coupled to an output of said delay circuit.

* * * * *